United States Patent

[11] 3,614,403

[72] Inventor Roland Borg Anderson
Silver Spring, Md.
[21] Appl. No. 818,367
[22] Filed Apr. 22, 1969
[45] Patented Oct. 19, 1971
[73] Assignee The Bunker-Ramo Corporation
Canoga Park, Calif.

[54] SYSTEM FOR CONVERTING TO A BCD CODE
17 Claims, 5 Drawing Figs.

[52] U.S. Cl. 235/155, 340/347 DD
[51] Int. Cl. H041 3/00
[50] Field of Search 340/347; 235/155

[56] References Cited

UNITED STATES PATENTS

| | | | |
|---|---|---|---|
| 3,535,500 | 10/1970 | Hu | 235/155 |
| 3,526,759 | 9/1970 | Clapper | 235/155 |
| 2,860,327 | 11/1958 | Campbell | 235/155 |
| 3,082,950 | 3/1963 | Hogan | 235/155 |
| 3,449,555 | 6/1969 | Wang | 340/347 |
| 3,521,040 | 7/1970 | Frentness | 235/92 |

*Primary Examiner*—Thomas A. Robinson
*Assistant Examiner*—Jeremiah Glassman
*Attorney*—Frederick M. Arbuckle

ABSTRACT: A static circuit for converting from a binary-based code to BCD. A separate converter is provided for each digit of the BCD code. Each converter includes means for summing the weighted bit values for the corresponding digit and means for converting the sum from the summing means into a binary-coded digit between zero and nine and an integral carry to the next higher digit position. For each digit position where the sum from the summing means exceeds a predetermined value (V), such as 29, the converting means includes a first means for reducing the sum of a value no greater than (V), and a second means for subtracting from the output of said first means an integral multiple of 10 so as to obtain the desired value between zero and nine.

INVENTOR
ROLAND B. ANDERSON

ATTORNEY
Ronald J. Kransdorf

SYSTEM FOR CONVERTING TO A BCD CODE

SYSTEM FOR CONVERTING TO BCD CODE

This invention relates to a system for converting from a multibit input code binary-coded decimal (BCD) code, and more particularly to a nonsequential or static circuit for converting from a binary-based code to BCD.

There are numerous applications where it is desired to convert a binary-coded value, or a value in a bit code such as grey code, into the equivalent value in BCD code. Existing circuits for performing this function have been of two general types. The more common type are sequential add-and-shift converters which perform the operation in a succession of steps under clock control, with the same components being reused for each stage of the operation. These circuits require only about $1.2n$ modules where $n$ is the number of input bits, and are therefore relatively inexpensive; but they are also relatively slow. The minimum time required to complete a conversion operation in the system of this type is equal to the number of steps in the operation multiplied by the response time of the circuits utilized.

Thus, for real-time operation, it has frequently been necessary to employ the second type of circuits which are known as static circuits. Since each component is used only once in these circuits, a conversion can ripple through the circuit without the need for clocking, and a substantially instantaneous response can be obtained. The speed of this circuit is limited only by the response time of the circuits employed. However, since each circuit is utilized only once, a relatively large number of circuits, up to $10n$ modules for $n$ less than 16,must be employed. These circuits are, therefore, quite expensive.

A need, therefore exists for a new approach to the nonsequential or static conversion of a binary-based or other bit code value into BCD. This approach should substantially reduce the number of components required, so as to reduce the cost of the static circuit, but still retaining the speed advantage of this type of circuit.

It is, therefore, a primary object of this invention to provide an improved circuit for converting from a binary-based code, or some other bit code, into BCD.

A more specific object of this invention is to provide an improved static binary-to-BCD converter.

A still more specific object of this invention is to provide a new approach to static binary-to-BCD conversion which permits a reduction in the number of components, and therefore, a reduction in cost, while still retaining the speed advantage of the static approach.

In accordance with these objects this invention provides a circuit for converting a value in a binary-based code to the equivalent value in BCD. A receiving circuit is provided for each digit of the BCD code. Each of these receiving circuits is adapted to sum the weighted bit values for the corresponding digit. A reducing circuit is provided for selected ones of the digits with each reducing circuit being adapted to convert the output from the corresponding receiving circuit into a binary-coded value which does not exceed a predetermined value (V). An integral decimal value is generated form the reducing circuit and applied as a carry input to the receiving circuit of the next higher digit position. A reducing circuit is provided for a given digit position only of the maximum sum of the weighted bit values applied to the corresponding receiving circuit is greater than (V). The final element in the circuit for each digit position is a subtracting means. Each subtracting means is adapted to convert the binary-coded output from the corresponding reducing circuit, if there is a reducing circuit for the given digit position, or the corresponding receiving circuit, into a binary-coded value between 0 and 9. For a preferred embodiment tens the invention, the value (V) is 29, and the subtracting means includes means for detecting the tens value of the binary-coded input applied to it. This tens value is then subtracted from the input to obtain the desired BCD value for the digit and the subtracted tens value is applied as an input to the receiving circuit of the next higher digit position. The above circuit requires less than $2n$modules for $n$less than 16, or, in other words, about one-fifth of the modules required by prior art static converters.

The foregoing and other objects, features and advantages of the invention will be apparent from the following, more particular description of preferred embodiments of the invention as illustrated in the accompanying drawings.

Figure 4A:
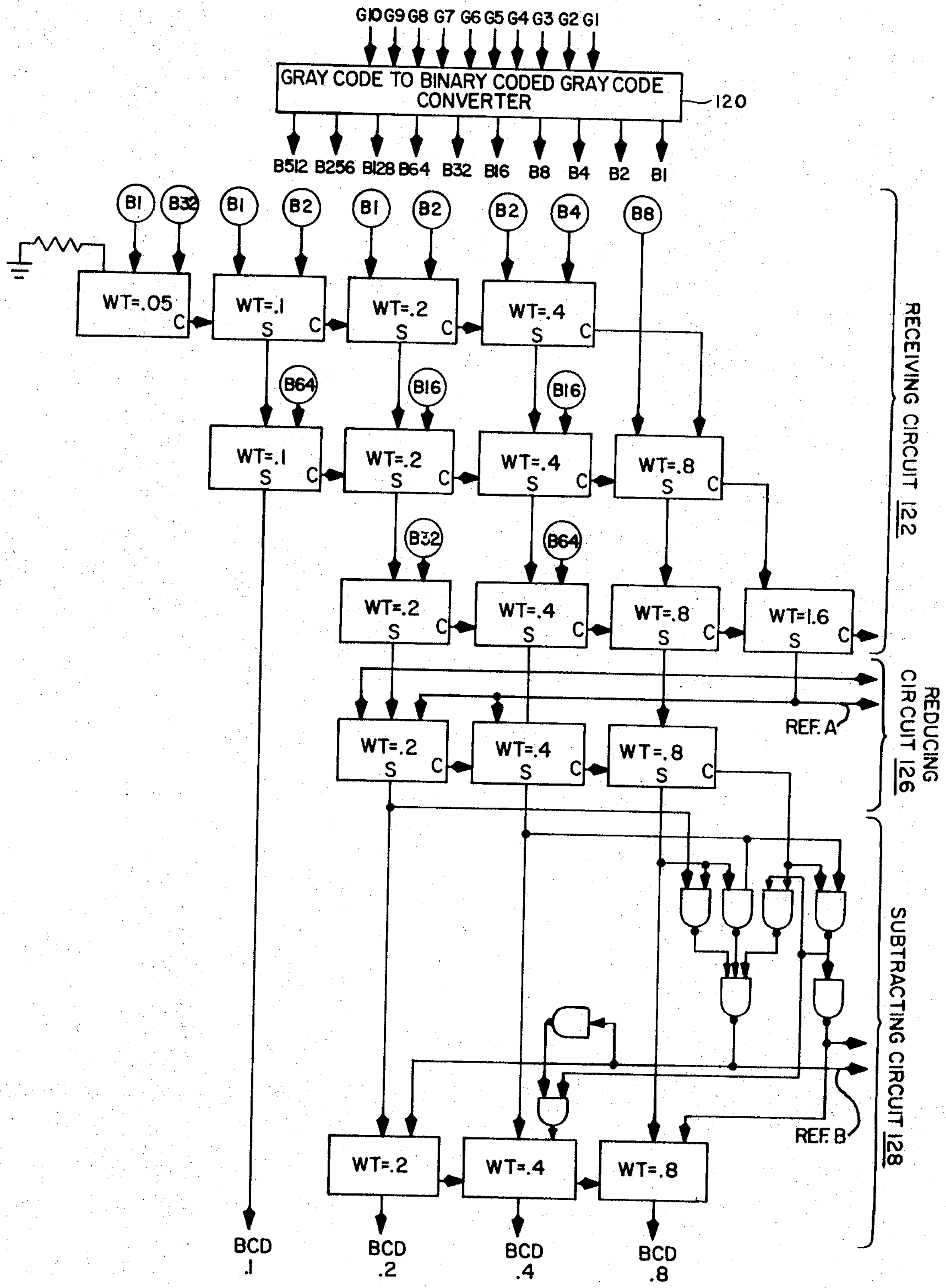
Figure 4B:
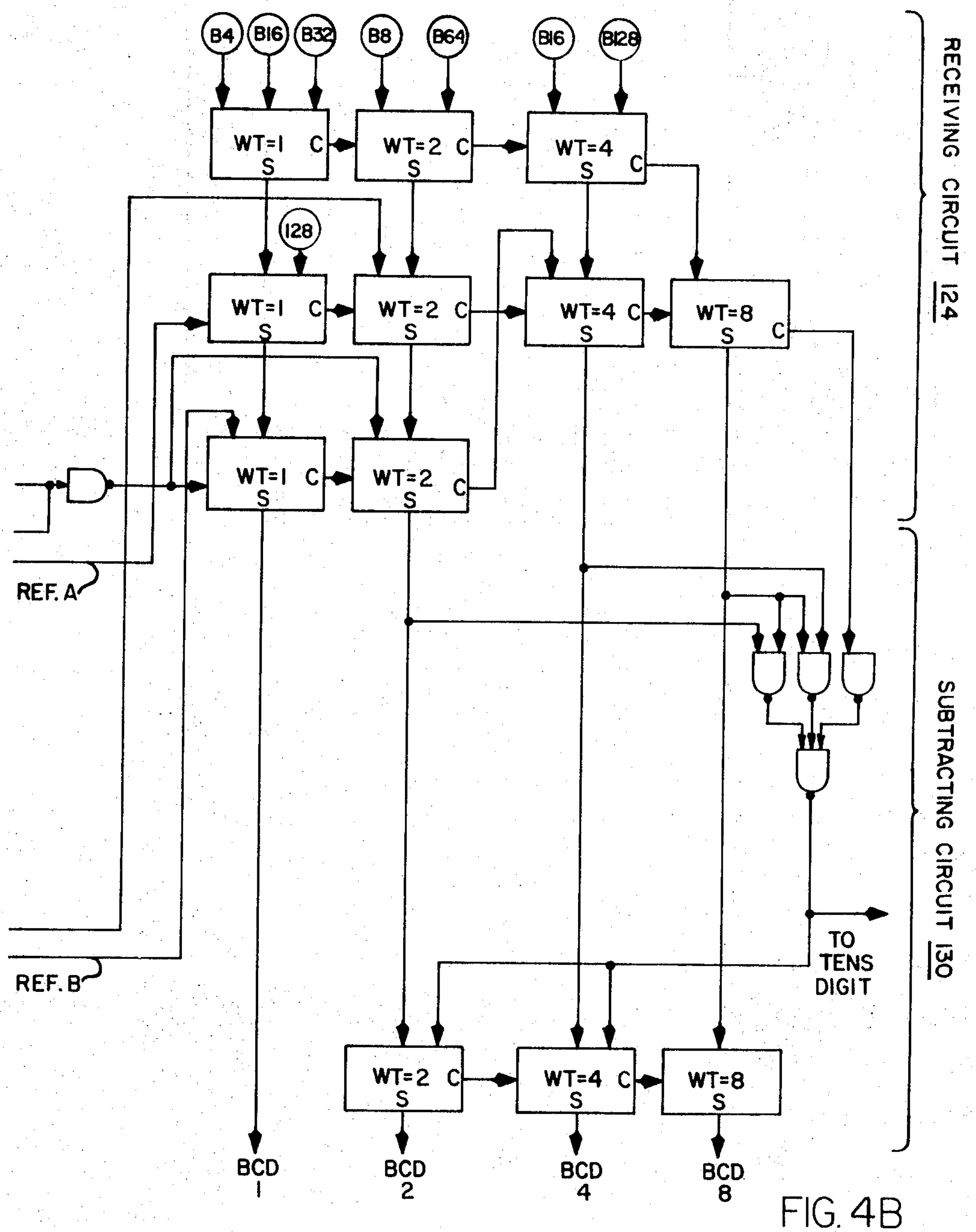

FIGS. 4A and 4B, when combined, form a schematic block diagram of two-digit positions of an alternative embodiment of the invention.

MATHEMATICAL BACKGROUND

The approach to binary-to-BCD conversion utilized in this invention is equivalent to that utilized by a person performing the conversion in long hand. A person performs the operation in three basic steps:

1. Convert each bit of the binary number into its decimal equivalent.

2. Sum the digit positions of the equivalent decimal numbers, starting with the least significant digit position and proceeding towards the most significant digit position. Each of these summing steps will result in a digit of the final decimal number and a carry to the next higher order digit position. The final sum is the decimal equivalent of the original binary number.

3. Convert each digit of the decimal number into its four-bit binary equivalent.

If it is assumed that the decimal equivalent value of the original binary number can be, at most, a five-digit number, then the general equation for expressing the relationship between the two numbers would be $$vwxyz = a_m(2^{m'1}) + a_{m11}(2^{m12})" \ldots + a_8(128) + a_7(64) + a_6(32a_5(16) + _4(8) + a_3(4) + a_2(2) + a_1(1) \qquad (1)$$

where ($a$) is either a 1 or a 0, ($z$) is the unit's digit of the decimal equivalent value, ($y$) is the tens digit, and so on. 5 Equation 1 can be expanded to $$vwxyz = a_m[10{,}000v_m + 1{,}000w_m + 100x_m + 10y_m + z_m] \qquad (2)$$
$$+ a_{m1}1[10{,}000v_m -_1 + 1{,}000w_{m11} + 100x_{m11} + 10y_{m11} + z_{m11}]$$
$$+ \ldots + a_8[100(1) + 10(2) + 8] + a_7[10(6) + 4] + a_6[10(3) + 2$$
$$+ a_5[16] + a_4[8] + a_3[4] + a_2[2] + a_1[1]$$

For purposes of the circuit which is to be constructed, a special rule pertains to $z5$, $z9$, $z13$, $z17$,...in equation (2) above. These quantities are set equal to 16 for $m$ greater than (6). For $m$ equal to five or six, $z5$ should be six. In both cases, the corresponding $y$ terms, $y5$, $y9$, $y13$, $y17$...should be adjusted to make the corresponding a terms equal in equations (1) and (2). For example, if $m=8$, the $a5$ term in equation (2) would be $a5(16)$, where $y5=0$ and $z5=16$. However, if $m=6$, the term would be written as $a5[10(1)+6]$, where $y5=1$ and $z5=6$.

By grouping the $z$-terms, $y$-terms, $x$-terms, etc., equation (2) can be rewritten:

$$vwxyz = 10{,}000[a_m v_m + a_{m11} v_{m11} + \ldots + a_{15}(1)]$$
$$+ 1{,}000[a_m w_m + a_{m11} w_{m11} + \ldots + a_{11}(1)]$$
$$+ 100[a_m x_m + a_{m11} x_{m11} + \ldots + a_8(1)] \qquad (3)$$
$$+ 10[(a_m y_m + a_{m11} y_{m11} + \ldots + a_6(3)] + [a_m z_m + a_{m11} z_{m11} + \ldots + a5(16) + a_4(8) + a_3(4) + a_2(2) + a_1(1)]$$

Equation (3) can be divided into five separate equations, the first of which is:

$$z = a_m z_m + a_{m1} z_{m1} + \ldots + a_5(16) + a_4(8) + a_3(4) + a_2(2) + a_1(1) - p \qquad (4)$$

where $p$ equals the highest multiple of 10 contained in the above sum without the $p$ term. For example, if the sum of the terms in equation (4), disregarding for the moment the $p$ term, was equal to 23, the value of $p$ would be equal to 20 and that of $z$ would be 3.

The remaining four equations obtained from equation (3) are:

$$y=a_m y_m+a_{m11} y_{m11}+\ldots+a_7(6)+a_8(3)+(p/10)-q \quad (5)$$

$$x=a_m x_m+a_{m11}+\ldots+a_8(1)+(q/10)-r \quad (6)$$

$$w=a_m w_m+a_{m11} w_{m11}+\ldots+a_{11}(1)+(r/10)-s \quad (7)$$

$$v=a_m v_m+a_{11} v_{m11}+\ldots+a_{15}(1)+(s/10 \quad (8)$$

where $q$, $r$, and $s$ are the highest multiples of 10 in the terms to be added (not counting the terms to be subtracted) in equations (5), (6), (7) respectively.

Equations (4)–(8) correspond to the columns of decimal numbers which are to be added to from the decimal equivalent number in step 2 indicated above. Equation (4) represents the addition of all units digits in the column, where $p/10$ is the number carried to the tens column and $z$ is a units digit of the sum being formed. Equation (5) adds the carry number from the units columns and all the digits in the ten column, here $q/10$ is the digit carried to the hundreds column and $y$ is the tens digit of the sum. The remaining equations are utilized to define succeeding digits of the decimal number. It should be noted that if $m=6$, v and 2 will both be 0; thus, the number of equations required to describe the decimal equivalent digits of a binary number is dependent on the maximum number of bits in the binary number.

CIRCUIT DESCRIPTION FOR FIGS. 1–3

Figure 1:
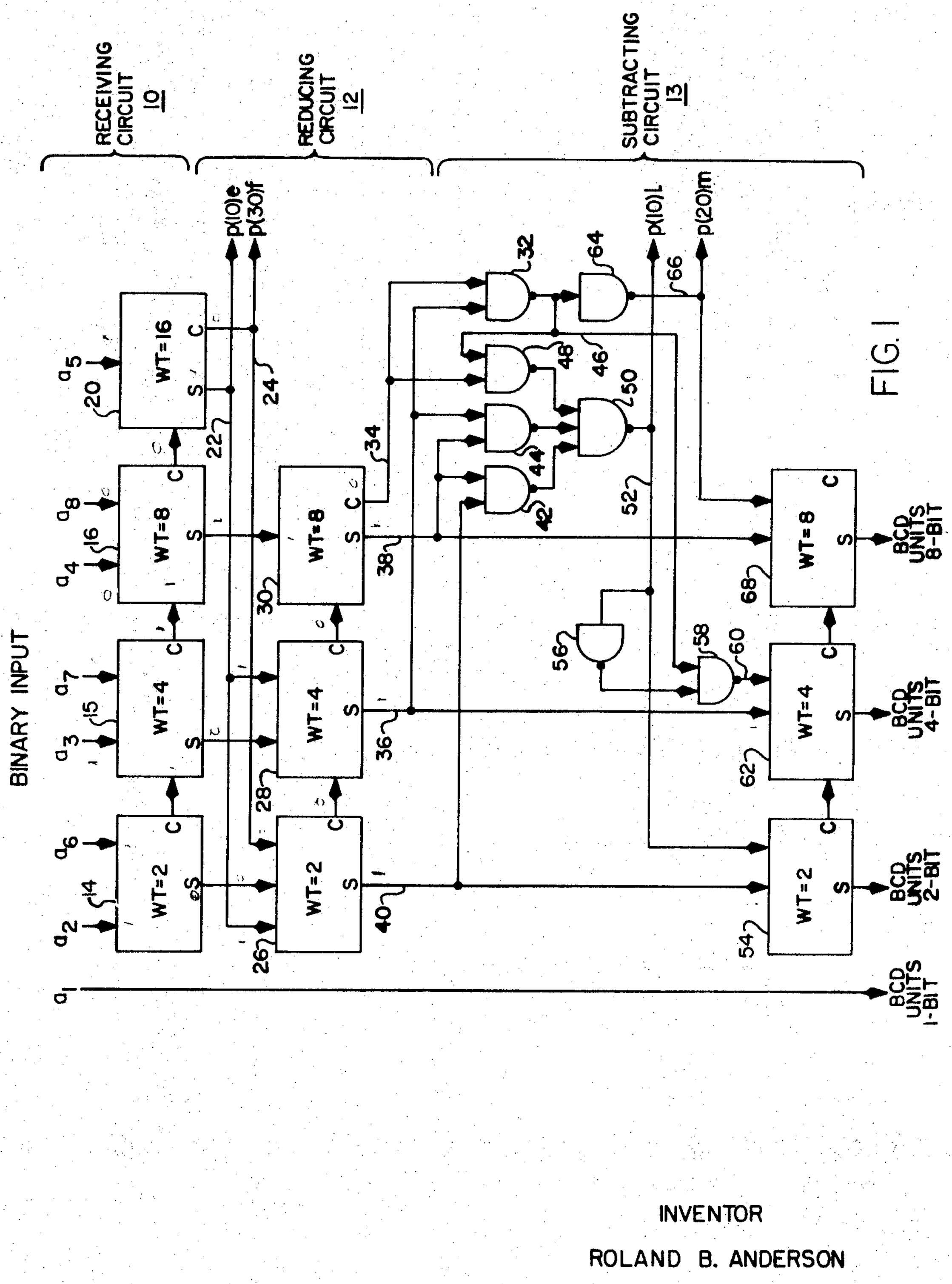
FIG. 1 is a schematic block diagram of a unit five-digit converter for an illustrative embodiment of the invention.
Figure 2:
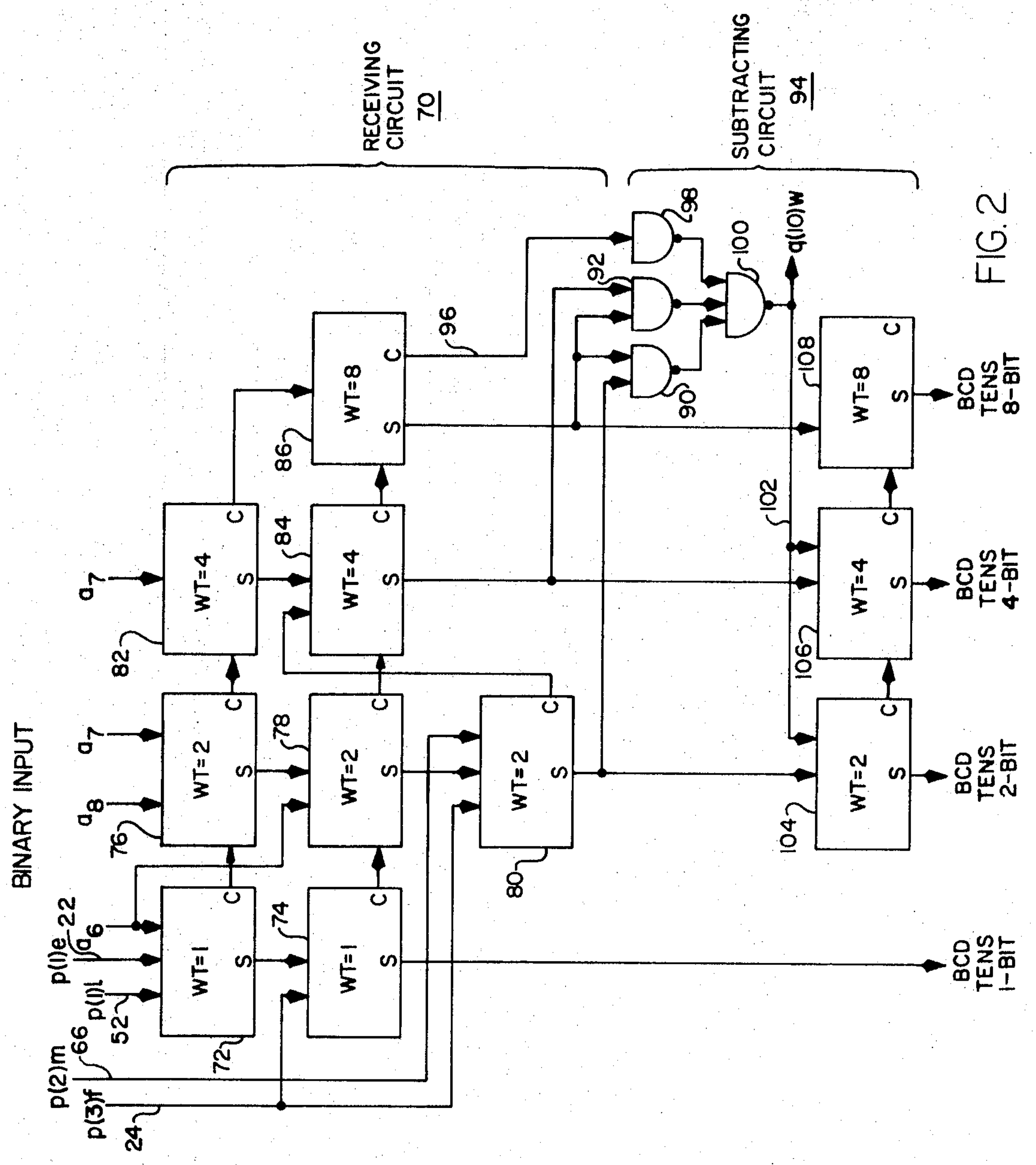
FIG. 2 is a schematic block diagram of a tens-digit converter for the embodiment of the invention of FIG. 1.
Figure 3:
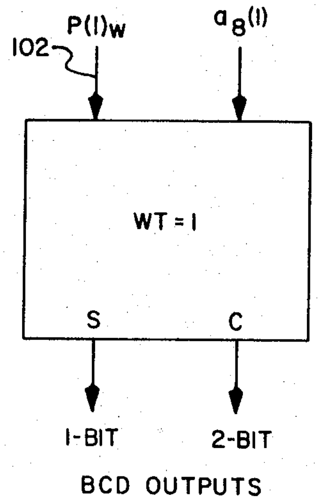
FIG. 3 is a schematic block diagram of a hundreds-digit converter for the embodiment of the invention of FIG. 1.

FIGS. 1, 2 and 3 illustrate circuits embodying the teachings of this invention which perform the operations of equations (4), (5) and (6) for an eight-bit binary number ($m=8$). It should be noted that, since an eight-bit binary number can have a decimal equivalent no greater than 255, there will be no $v$ or $w$ term, and therefore, only tree circuits are required in order to perform the desired conversion.

Referring now to FIG. 1, it is seen that a circuit for forming the $z$ or units term of the BCD number, the least significant digit of this number, is divided into three sections. These sections are receiving circuit 10, reducing circuit 12, and subtracting circuit 13. Receiving circuit 10 performs the conversion of the binary number into its decimal equivalent (step 1 above) and also performs the first step of the addition required in step 2. Reducing circuit 12 and subtracting circuit 13 are both concerned with converting the sum obtained from the receiving circuit into a $z$ digit and carry ($p$) to the next higher digit position. It has been found that the circuitry required to perform this function can be substantially reduced by performing the function in two steps. The function of the reducing circuit is to reduce the output from the receiving circuit to a value between 0 and 29 with multiples of 10 in excess of these values being applied as carries to the next higher digit position. The subtracting circuit then is capable, with a minimum of circuitry, of reducing the number to a single digit between 0 and 9 with 0 of 10 in excess of this value again being applied as a carry to the next higher digit position.

In FIG. 1 there is one input of weight 16, two inputs of weight 8, two inputs of weight 4, two inputs of weight 2, and one input of weight 1. The highest value which the input may assume is thus equal to 45. Since this is a value greater than 29, a reducing circuit 12 is required. Looking not in more detail at the receiving circuit, it is seen that the $a1$. bit is the only odd bit and is thus the same both for the input value and the least significant bit of the unity BCD digit. This is thus applied directly to the circuit output. The receiving circuit also has four binary full adders each of which has a different weight assigned to it. Each of these adders is capable of accepting three new inputs, or two new inputs and a carry form a preceding adder, and is capable of generating a sum and carry output. These adders my be of any standard type, but are preferably, for cost reasons, solid-state adders of the LSI or MSI type. From equation (4), it is seen that the $a2$ and $a6$ bits are applied to adder 14 of weight 2, the $a3$ and $a7$ bits are applied to adder 15 of weight 4, and $a4$ and $a8$ bits are applied to adder 16 of weight 8, and the $a5$ bit is applied to an input to adder 20 of weight 16. The carry output from each of the adders is applied as an input to the adder of next higher weight.

The sum output on line 22 from adder 20 has a weight of 16 while the carry output from this adder on line 24 has a weight of 32. In order to reduce the output from receiving circuit 10, which may have a value up to 45, to a value between 0 and 29, the sum output on line 22 is applied as a carry output of value 10 to the next higher digit position (the manner in which this output is utilized will be described shortly) and the quantity 6 is adder to the output from the receiving circuit adders 14 and 15 in a weight 2 adder 26 and a weight 4 adder 28 of reducing circuit 12. Similarly, the carry output of weight 32 on line 24 is applied as a carry of 30 to the next higher digit position and the value 2 is added to the output from receiving circuit adder 14 in weight 2 adder 26. Reducing circuit 12 also includes a weight 8 adder 30.

Since the inputs to the reducing circuit adders are one input of weight 8, two inputs of weight 4, three inputs of weight 2 and one input of weight 1, the maximum output which can be obtained from this circuit is 23. The reducing circuit is thus effective to reduce the original input to a value between 0 and 23. The subtracting circuit 13 must now determine whether the output from that reducing circuit is a value between 0 and 9, a value between 10 and 19, or a value between 20 and 23, and, in response to this detection, must subtract the appropriate multiple of 10 from this quantity in order to obtain the desired output value. The subtracted value is applied as a carry to the next higher digit position.

The method utilized for subtraction in this circuit is the "twos complement method." With this method, a binary number (a) is subtracted from a binary number (b) by adding the binary complement of (a), plus 1, to (b), and dropping the highest valued 1 bit of the result. Thus, if the circuit is to subtract 10 (binary 1010), the complement of 10 (binary 0101), plus 1 (binary0110), is added to the input number. The number in the last set of parentheses is a binary 6. To subtract 20 (binary10100), the complement of 20 (binary 01011), plus 1 (binary 1100), is added to the input number. The number in the last set of parentheses in this case is the binary number for 12. Thus, in subtracting circuit 13, if it is detected that the output from the reducing circuit is 20 or greater, a binary 12 is added to the output from the reducing circuit and the 32 bit of the result is dropped, while, if the output from the reducing circuit is between 10 and 19, a binary 6 is added to this output, and the 16 bit of the result dropped. If the input to the subtracting circuit is less than 10, nothing is added to subtracted from it.

Referring now to FIG. 1, it is seen that the detection of an output from reducing circuit 12 between 20 and 23 is accomplished by NAND-gate 32. One input to this gate is output line 34 for adder 30, which line has a weight of 16, and the other input is sum output line 36 from adder 28, which line has a weight of 4. It should be noted that the only other way a sum in excess of 20 could be obtained would be for there to be a signal on carrying line 34 and sum line 38 from adder 30. However, since line 38 has a weight of 8, the combined weight of lines of 34 and 38 is 24. Since, from the inputs, an output of 23 is the greatest which the circuit can produce, this is not a possible condition and a provision need not be made for its detection. There are three possible conditions under which a reduced sum between 10 and 19 may be obtained. The first of these is when a signal appears on weight 8 line 38 and a signal also appears on weight 2, sum output line 40 from adder 26. This condition is detected by NAND-gate 42. The second condition is when a signal appears on weight 4 line 36 and weight-8 line 38. This condition is detected by NAND-gate 44. The final condition is when a signal appears on weight 16 line 34, but there is no output from NAND-gate 32 on line 46. This condition is detected by NAND-gate 48.

If a condition to be detected by any one of the NAND-gates 42, 44, or 48 is present, there will be at least one negative input to NAND-gate 50, resulting in a positive output on line 52. A positive output on line 52 thus indicates that the input to the subtracting circuit is a quantity between 10 and 19. From the discussion above, this means that 10 must be subtracted from this input and carried to the next higher digit position. As may be seen, line 52 is applied as a carry input to the next higher digit position. From previous discussions it will be remembered that the subtraction of 10 from the input is accomplished by adding 6. The line 52 is thus connected as an input to weight 2 adder 54 and through inverter 56 as one input to NAND-gate 58. Output line 60 from NAND-gate 58 is applied as one input to weight 4 adder 62. Thus, if a signal appears on line 52, a 2 will be added to the output from the reducing circuit and inverter 56 will apply a negative input to NAND-gate 58 resulting in a positive signal on line 60 which causes a 4 to also be added to the subtracting circuit input. This causes 10 to be subtracted from the subtracting circuit input resulting in the desired BCD output. Similarly, a positive output from NAND-gate 32 on line 46 is inverted by inverter 64 to provide a positive output on line 66. A negative signal on line 46 and a positive signal on line 66 thus indicate that the quantity applied by the reducing circuit to the subtracting circuit is between 20 and 23. Under these conditions, a carry of 20 to the next higher digit is desired, and 20 is to be subtracted from the subtracting circuit input. Line 66 is connected as an input to the next higher digit position with a weight of 2. It will be remembered that the subtraction of 20 is accomplished by the adding of 12 and the dropping of the most significant, or carry bit. Thus, line 66 is connected as an input to weight 8 adder 68 and line 46 is connected as the other input to NAND-gate 58. Thus, when a number between 20 and 23 is detected, 4 and 8 (or in other words 12) are added to the subtracting circuit input to generate the desired BCD output for the least significant, or *z*, bit position.

FIG. 2 shows the circuit for the next digit position, the *y* or tens digit position, of the BCD number. This circuit looks different from that in FIG. 1 for at least two reasons. First, since the sum of the weighted inputs to this circuit cannot exceed 18, there is no need for a reducing circuit, and, in fact the subtracting circuit is also substantially simplified since only the conditions 0–9 and 10–18 need be detected. Secondly, since there are four inputs of weight 1, and five inputs of weight 2, and since each adder can accept no more than three inputs, the receiving circuit requires more than the single row of adders shown in FIG. 1. In fact, receiving circuit 70 requires two adders 72 and 74 of weight 1, three adders 76, 78, and 80 of weight 2, two adders 82 and 84 of weight 4, and one adder 86 of weight 8. The particular adder of a given weight to which a given one of the inputs is applied is not critical so long as each input is applied to one and only one of the inputs of its assigned weight. Thus, weight 1 inputs 22 and 52 are connected as inputs to adder 72, while weight 3 input (*a6*) is connected as an input to both adder 72 and 78. (*a7*) and (*a8*) are connected as inputs to adder 76 and *a7* is also connected as the input to adder 82. Weight 2 carry line 66 is connected as one of the inputs to adder 80, while weight 3 input 24 is connected as an input to both adders 74 and 80. NAND-gates 90 and 92 in subtracting circuit 94 perform the same functions as NAND-gates 42 and 44 perform in subtracting circuit 13. However, since there is no possibility of an output from receiving circuit 70 exceeding 20, the carry output on line 96 of weight 16 is applied through inverter 98 to one input of NAND-gate 100. NAND-gate 100 performs the same function as NAND-gate 50 with a positive output on line 102 indicating that the received value is between 10 and 18. A subtraction is thus required with 10 being carried to the next higher digit position. Line 102 is connected as an input to weight 2 adder 104 and weight 4 adder 106 to cause the desired subtraction to be performed by twos complement addition. The outputs from weight 1 adder 74, weight 2 adder 104, weight 4 adder 106, and weight 8 adder 108 from the BCD code for the *Y* or tens digit.

As may be seen from FIG. 3, with *m*=8 the circuit for generating the *x* or hundreds digit in BCD requires only a single adder of weight 1. Carry line 102 of weight 1 from the tens digit position 102 is connected as one input to this adder and the *a8* line is connected as the other input. The sum and carry outputs from this adder, of weights 1 and 2 respectively, form the BCD output for this digit position.

From the above it is seen that binary-to-BCD conversion in the circuit of this invention is performed by providing a separate circuit for each digit position of the BCD output. Each of these circuits has a receiving circuit for summing the properly weighted inputs to the given digit position. If the number of inputs, including carries from adders of lower weight, to a given weight adder in the receiving circuit exceeds three, then at least two adders will have to be ganged in order to effect the desired addition. If the total exceeds five, three adders will have to be ganged, with another adder being added to each two additional inputs of the given weight. If the maximum sum of the weighted inputs to the receiving circuit of a given digit position is greater than 29, a reducing circuit is provided to reduce this value to a value which does not exceed 29. The amount by which the output from the receiving circuit is reduced is applied as a carry to the next higher digit position. The highest multiple of 10 in the output from the receiving circuit, or from the reducing circuit if one is required, is then detected in a subtracting circuit, subtracted from the input to the subtracting circuit to obtain the desired BCD digit, and applied as a carry input to the next higher digit position.

FIGS. 4A and 4B illustrate that the teachings of this invention can be utilized even when weights other than 1, 2, 4, etc. are assigned to the individual binary bits. In FIG. 4 the input is in a standard grey code, which code is converted in circuit 120 into a binary code the base of which is 0.35. Thus, B1 has a weight of 0.35, B2 has a weight of 0.7, B4 has a weight of 1.4, B8 has a weight of 2.8, etc. These inputs are applied to appropriately weighted adders in receiving circuits 122 and 124 for the decimal digit and the units digit respectively. The output from receiving circuit 122 is reduced in reducing circuit 126, the output from which is applied to a subtracting circuit 128 which is identical to that shown and described with reference to FIG. 1. The output from subtracting circuit 128 is the BCD code for the decimal digit. Similarly, the output from receiving circuit 124 is applied to subtracting circuit 130 which circuit is substantially identical to the subtracting circuit in FIG. 2. The output from subtracting circuit 130 is the BCD code for the units digit of the circuit output. Circuits for the tens and hundreds digits of the output can be similarly provided.

While the invention has been particularly shown and described with reference to preferred embodiments thereof, it will be understood by those skilled in the art that various changes in form and details may be made therein without departing from the spirit and scope of the invention.

What is claimed is:

1. A circuit for converting a value in a binary-based bit code to the equivalent value in BCD comprising:

- a receiving circuit for each digit of said BCD code, each of said receiving circuits being adapted to sum the weighted bit values for the corresponding digits;
- reducing circuits for selected ones of said digits, each of said reducing circuits being adapted to convert the output from the corresponding receiving circuit into a binary-coded value which does not exceed a predetermined value (V) and an integral decimal value which is carried as an input to the receiving circuit of the next-higher digit position; and
- subtracting means for each BCD digit for which the maximum sum of the weighted bit values applied to the corresponding receiving circuit is greater than nine, each of said subtracting means being adapted to convert the binary-coded output from the corresponding reducing circuit, if one is present for the digit position, or the corresponding receiving circuit, to a binary-coded value between zero and nine.

2. A circuit of the type described in claim 1 wherein there is a reducing circuit for a given digit position only if the maximum sum of the weighted bit values applied to the corresponding receiving circuit is greater than (V).

3. A circuit of the type described in claim 1 wherein (V) is twenty-nine.

4. A circuit of the type described in claim 1 wherein each of said subtracting means includes means for detecting the tens value of its binary-coded input, means for subtracting the detected tens value from said input, and means for applying said tens value as an input to the next higher digit position.

5. A circuit of the type described in claim 4 wherein the subtracting by said subtracting means is by the twos complement method.

6. A circuit of the type described in claim 4 wherein said subtracting means includes first-gating means for detecting each of the possible bit input combinations to said subtracting means which can provide a value between 10 and 19, second-gating means for detecting each of the possible bit input combinations to said subtracting means which can provide a value between 20 and the highest value which the input to said subtracting means may assume, means responsive to an output from said first-gating means for subtracting 10 from the input to said gating means and for applying a carry of one to the next higher digit position, and means responsive to an output from said second-gating means for subtracting 20 from the input to said subtracting means and for applying a carry of two to the next higher digit position.

7. A circuit of the type described in claim 6 wherein the subtraction of 10 is accomplished by adding a binary 6 to the subtracting circuit input and wherein the subtracting of 20 is accomplished by adding a binary 12 to the subtracting circuit input, with the highest binary bit from each of the above sums being dropped.

8. A circuit of the type described in claim 1 wherein said reducing circuit includes means responsive to each output from said receiving circuit of weight greater than 10 for adding the weighted units value of said output to the other unit outputs from said receiving circuit, and for applying the tens value of said output as a carry to the next higher digit position.

9. A circuit of the type described in claim 1 wherein the weighted inputs for each digit position are applied to said receiving circuit in binary-coded form and are summed in this form.

10. A circuit of the type described in claim 9 wherein the base value for the binary-based bit code may be other than one.

11. A circuit of the type described in claim 10 including means for applying to said circuit a nonbinary based code, and means for converting said nonbinary-based code into a binary-based code.

12. A static circuit for converting a value in a binary-based code to the equivalent value in BCD wherein there is a separate converting circuit for each decimal digit of said BCD value, each of said converting circuits comprising:

means for the substantially simultaneous summing of only the weighted bit values for the corresponding digit; and means for converging the units digit of the sum from said summing means into a binary-coded digit between zero and nine and for converging the effective tens digit of said sum into an integral carry to the next higher digit position.

13. A circuit of the type described in claim 12 wherein, for digit positions where said sum from the summing means may exceed a predetermined value (V), said converting means includes a first means for reducing said sum to a value no greater than (V), and a second means for subtracting from the output of said first means an integral multiple of ten so as to obtain said desired value between zero and nine.

14. A circuit of the type described in claim 13 wherein (V) equals twenty-nine.

15. A circuit of the type described in claim 12 herein said converting means generates a carry to the next higher digit position only if the sum from said summing means may exceed nine.

16. A circuit of the type described in claim 12 wherein the weighted bit value inputs to said summing means are in binary-coded form and wherein said bit values are summed in this form.

17. A circuit of the type described in claim 9 wherein each of said receiving circuits included a plurality of binary full adders, each of which may accept three binary inputs, with the number of adders of a given weight in each receiving circuit being equal to the units value of N/2 where N is equal to the number of inputs, including carries from adders of lower weight, to the adders of said given weight.